(12) United States Patent
Uozumi et al.

(10) Patent No.: US 10,364,304 B2
(45) Date of Patent: Jul. 30, 2019

(54) METHOD FOR PRODUCING SOLID CATALYST COMPONENT FOR OLEFIN POLYMERIZATION, CATALYST FOR OLEFIN POLYMERIZATION, AND METHOD FOR PRODUCING OLEFIN POLYMER

(75) Inventors: Toshiya Uozumi, Chigasaki (JP); Shingo Yamada, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 306 days.

(21) Appl. No.: 14/240,588

(22) PCT Filed: Aug. 3, 2012

(86) PCT No.: PCT/JP2012/069854
§ 371 (c)(1),
(2), (4) Date: Mar. 14, 2014

(87) PCT Pub. No.: WO2013/027560
PCT Pub. Date: Feb. 28, 2013

(65) Prior Publication Data
US 2014/0206827 A1    Jul. 24, 2014

(30) Foreign Application Priority Data

Aug. 25, 2011 (JP) ................... 2011-183774

(51) Int. Cl.
*C08F 4/64* (2006.01)
*C08F 110/06* (2006.01)

(52) U.S. Cl.
CPC .................. *C08F 110/06* (2013.01)

(58) Field of Classification Search
CPC ............................ C08F 4/6494; C08F 4/6546
USPC ......................................... 526/213; 502/127
See application file for complete search history.

(56) References Cited

U.S. PATENT DOCUMENTS

| 4,952,649 | A | 8/1990 | Kioka et al. | |
| 6,228,793 | B1 * | 5/2001 | Hosaka .................. | C08F 10/00 502/125 |
| 7,208,435 | B2 * | 4/2007 | Hosaka .................. | C08F 10/00 502/102 |
| 9,670,294 | B2 * | 6/2017 | Hosaka .................. | C08F 110/06 |
| 2005/0227856 | A1 * | 10/2005 | Hosaka .................. | C08F 10/00 502/102 |

FOREIGN PATENT DOCUMENTS

| EP | 1 533 322 A1 | 5/2005 | |
| JP | 57-63310 | 4/1982 | |
| JP | 57-63311 | 4/1982 | |
| JP | 58-83006 | 5/1983 | |
| JP | 63-3010 | 1/1988 | |
| JP | 1-315406 | 12/1989 | |
| JP | 2004-107462 | 4/2004 | |
| JP | 2005-281682 | 10/2005 | |
| JP | 2006-328294 | 12/2006 | |
| KR | 10-0169718 B1 | 3/1999 | |
| WO | WO-2014013916 A1 * | 1/2014 | ............ C08F 110/06 |

OTHER PUBLICATIONS

U.S. Appl. No. 14/131,052, filed Apr. 9, 2014, Uozumi, et al.
U.S. Appl. No. 14/130,799, filed Jan. 3, 2014, Tashino, et al.
International Search Report dated Oct. 9, 2012, in PCT/JP12/069854 filed Aug. 3, 2012.
Extended European Search Report dated Dec. 8, 2014 in Patent Application No. 12826037.9.
Korean Office Action dated Nov. 30, 2017 in Korean Patent Application No. 10-2014-7006083 (with English translation), 16 pages.

* cited by examiner

*Primary Examiner* — Rip A Lee
(74) *Attorney, Agent, or Firm* — Oblon, McClelland, Maier & Neustadt, L.L.P.

(57) ABSTRACT

A method for producing a solid catalyst component for olefin polymerization includes bringing a magnesium compound, a tetravalent titanium halide compound, and an electron donor compound represented by a general formula (1) into contact with each other, reacting the mixture, washing the resulting reaction product to obtain a solid component, bringing the solid component, a tetravalent titanium halide compound, and an electron donor compound represented by a general formula (2) into contact with each other, reacting the mixture, and washing the resulting reaction product.

$$(R^1)_k C_6 H_{4-k}(COOR^2)(COOR^3) \quad (1)$$

$$R^4 R^5 C(COOR^6)_2 \quad (2)$$

A polymer that exhibits high activity with respect to hydrogen, high stereoregularity, and high bulk density can be obtained using a catalyst including a solid catalyst component obtained by the method.

9 Claims, No Drawings

METHOD FOR PRODUCING SOLID CATALYST COMPONENT FOR OLEFIN POLYMERIZATION, CATALYST FOR OLEFIN POLYMERIZATION, AND METHOD FOR PRODUCING OLEFIN POLYMER

This application is a National Stage of PCT/JP12/069854 filed Aug. 3, 2012 and claims the benefit of JP 2011-183774 filed Aug. 25, 2011.

TECHNICAL FIELD

The invention relates to a method for producing a solid catalyst component for olefin polymerization that exhibits excellent activity with respect to hydrogen, and makes it possible to obtain a polymer having high stereoregularity and high bulk density, and also relates to an olefin polymerization catalyst and a method for producing an olefin polymer.

BACKGROUND ART

A solid catalyst component that includes magnesium, titanium, an electron donor compound, and a halogen as essential components has been used when polymerizing an olefin (e.g., propylene). Various methods have been proposed that polymerize or copolymerize an olefin in the presence of an olefin polymerization catalyst that includes the solid catalyst component, an organoaluminum compound, and an organosilicon compound.

For example, Patent Document 1 (JP-A-57-63310) and Patent Document 2 (JP-A-57-63311) disclose a method that polymerizes an olefin having 3 or more carbon atoms using a catalyst that includes a solid catalyst component, an organoaluminum compound, and an organosilicon compound having an Si—O—C linkage, the solid catalyst component including a magnesium compound, a titanium compound, and an electron donor. However, since the above method is not necessarily satisfactory in order to obtain a polymer having high stereoregularity in high yield, a further improvement has been desired.

Patent Document 3 (JP-A-63-3010) discloses a propylene polymerization catalyst and a propylene polymerization method, the propylene polymerization catalyst including a solid catalyst component, an organoaluminum compound, and an organosilicon compound, the solid catalyst component being obtained by heating a powder product obtained by bringing a dialkoxymagnesium, an aromatic dicarboxylic diester, an aromatic hydrocarbon compound, and a titanium halide compound. Patent Document 4 (JP-A-1-315406) discloses a propylene polymerization catalyst and a propylene polymerization method that utilizes the propylene polymerization catalyst, the propylene polymerization catalyst including a solid catalyst component, an organoaluminum compound, and an organosilicon compound, the solid catalyst component being prepared by bringing titanium tetrachloride into contact with a suspension that includes a diethoxymagnesium and an alkylbenzene, reacting phthalic dichloride with the mixture to obtain a solid product, and reacting the solid product with titanium tetrachloride in the presence of an alkylbenzene. The above techniques aim to achieve high activity that makes it possible to omit a deashing step that removes catalyst residues (e.g., chlorine and titanium) from the resulting polymer, improve the yield of the stereoregular polymer, and maintain the catalytic activity during polymerization. Good results are obtained by the above techniques. An olefin polymer produced using such a catalyst is melted, and molded (using molding machine or stretching machine) into a product used for a variety of applications (e.g., vehicle, household electric appliance, container, and film). However, since such an olefin polymer exhibits a melt flow rate insufficient for high-speed stretching and high-speed injection molding, various studies have been conducted in order to deal with the above problem.

The melt flow rate of an olefin polymer significantly varies depending on the molecular weight of the olefin polymer. For example, an olefin polymer having a low molecular weight has a high melt flow rate. Therefore, the molecular weight of an olefin polymer is normally reduced by adding hydrogen during polymerization in order to obtain an olefin polymer having a high melt flow rate. In this case, a large amount of hydrogen is normally added during polymerization.

However, the amount of hydrogen that can be added during polymerization is limited due to the pressure resistance of the polymerization reactor. Therefore, it is necessary to reduce the partial pressure of olefin gas subjected to polymerization in order to add a larger amount of hydrogen. In this case, the productivity inevitably decreases. Moreover, the stereoregularity of the resulting olefin polymer may deteriorate when a large amount of hydrogen is used. It is also uneconomical. Therefore, development of a catalyst has been desired that makes it possible to produce an olefin polymer having a high melt flow rate using a small amount of hydrogen (i.e., exhibits high activity with respect to hydrogen), and produce an olefin polymer having high stereoregularity in high yield.

For example, Patent Document 5 (JP-A-2004-107462) discloses a propylene polymerization catalyst and a propylene polymerization method, the propylene polymerization catalyst including a solid catalyst component, an organoaluminum compound, and an organosilicon compound, the solid catalyst component being obtained by bringing a dialkoxymagnesium, a titanium halide compound, a phthalic diester, and a malonic diester into contact with each other.

The propylene polymerization catalyst disclosed in Patent Document 5 exhibits good activity with respect to hydrogen as compared with a known catalyst that utilizes a phthalic diester. However, the propylene polymerization catalyst disclosed in Patent Document 5 does not necessarily exhibit catalytic performance that ensures both stereoregularity and hydrogen response (i.e., lacks a capability to produce a polymer having both high stereoregularity and a high melt flow rate). Therefore, a further improvement has been desired. Moreover, development of a catalyst that makes it possible to produce polymer particles having a higher bulk density has also been desired.

RELATED-ART DOCUMENT

Patent Document

Patent Document 1: JP-A-57-63310
Patent Document 2: JP-A-57-63311
Patent Document 3: JP-A-63-3010
Patent Document 4: JP-A-1-315406
Patent Document 5: JP-A-2004-107462

SUMMARY OF THE INVENTION

Technical Problem

An object of the invention is to provide a method for producing a solid catalyst component for olefin polymerization that exhibits high activity with respect to hydrogen, and makes it possible to obtain a polymer having high stereoregularity and high bulk density, an olefin polymerization catalyst, and a method for producing an olefin polymer.

Solution to Problem

In view of the above situation, the inventors of the invention conducted extensive studies in order to achieve the above object. As a result, the inventors found that the above object can be achieved by a solid catalyst component that is obtained by bringing a solid component, a titanium halide compound, and a malonic diester or a substituted malonic diester into contact with each other, the solid component being prepared using a magnesium compound and a phthalic diester or a substituted phthalic diester (electron donor compound), and having been washed. This finding has led to the completion of the invention.

According to one aspect of the invention, a method for producing a solid catalyst component for olefin polymerization includes bringing a magnesium compound, a tetravalent titanium halide compound, and an electron donor compound represented by the following general formula (1) into contact with each other, reacting the magnesium compound, the tetravalent titanium halide compound, and the electron donor compound represented by the general formula (1) to obtain a reaction product, washing the reaction product to obtain a solid component, bringing the solid component, a tetravalent titanium halide compound, and an electron donor compound represented by the following general formula (2) into contact with each other, reacting the solid component, the tetravalent titanium halide compound, and the electron donor compound represented by the general formula (2) to obtain a reaction product, and washing the reaction product.

$$(R^1)_kC_6H_{4-k}(COOR^2)(COOR^3) \quad (1)$$

wherein $R^1$ is an alkyl group having 1 to 8 carbon atoms or a halogen atom, $R^2$ and $R^3$ are an alkyl group having 1 to 12 carbon atoms, provided that $R^2$ and $R^3$ are either identical or different, and k (i.e., the number of substituents $R^1$) is 0, 1, or 2, provided that $R^1$ are either identical or different when k is 2.

$$R^4R^5C(COOR^6)_2 \quad (2)$$

wherein $R^4$ and $R^5$ are a hydrogen atom, a halogen atom, a linear alkyl group having 1 to 20 carbon atoms, a branched alkyl group having 3 to 20 carbon atoms, a linear halogen-substituted alkyl group having 1 to 20 carbon atoms, a branched halogen-substituted alkyl group having 3 to 20 carbon atoms, a cycloalkyl group having 3 to 20 carbon atoms, an aromatic hydrocarbon group, a vinyl group, an allyl group, or an aralkyl group, provided that $R^4$ and $R^5$ are either identical or different, and $R^6$ is a linear alkyl group having 1 to 20 carbon atoms, a branched alkyl group having 3 to 20 carbon atoms, a cycloalkyl group having 3 to 20 carbon atoms, an aromatic hydrocarbon group, a vinyl group, an allyl group, or an aralkyl group, provided that $R^6$ are either identical or different.

According to another aspect of the invention, an olefin polymerization catalyst includes (I) a solid catalyst component for olefin polymerization obtained by the method according to one aspect of the invention, (II) an organo aluminum compound represented by the following general formula (3), and (III) an external electron donor compound.

$$R^7_pAlQ_{3-p} \quad (3)$$

wherein $R^7$ is an alkyl group having 1 to 6 carbon atoms, Q is a hydrogen atom or a halogen atom, and p is a real number that satisfies $0<p\le3$.

According to a further aspect of the invention, a method for producing an olefin polymer includes polymerizing an olefin in the presence of the olefin polymerization catalyst.

Advantageous Effects of the Invention

An olefin polymer having high stereoregularity, a high melt flow rate, and high bulk density can be obtained using a small amount of hydrogen by utilizing a solid catalyst component for olefin polymerization obtained by the method according to one aspect of the invention and the olefin polymerization catalyst.

DESCRIPTION OF EMBODIMENTS

A method for producing a solid catalyst component for olefin polymerization (hereinafter may be referred to as "solid catalyst component (A)") according to one embodiment of the invention includes a step I that includes bringing a magnesium compound, a tetravalent titanium halide compound, and an electron donor compound represented by the general formula (1) into contact with each other, reacting the magnesium compound, the tetravalent titanium halide compound, and the electron donor compound represented by the general formula (1) to obtain a reaction product, and washing the reaction product to obtain a solid component, and a step II that includes bringing the solid component obtained by the step I, a tetravalent titanium halide compound, and an electron donor compound represented by the general formula (2) into contact with each other, reacting the solid component, the tetravalent titanium halide compound, and the electron donor compound represented by the general formula (2) to obtain a reaction product, and washing the reaction product to obtain a solid catalyst component. Note that the washing in the step I may be referred to as "intermediate washing", and the washing in the step II may be referred to as "final washing".

Examples of the magnesium compound used in the step I (hereinafter may be referred to as "magnesium compound (a)") include a magnesium dihalide, a dialkylmagnesium, an alkylmagnesium halide, a dialkoxymagnesium, a diaryloxymagnesium, an alkoxymagnesium halide, a fatty acid magnesium, and the like. Among these, a dialkoxymagnesium is preferable. Specific examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. It is particularly preferable to use diethoxymagnesium. These dialkoxymagnesiums may be prepared by reacting magnesium metal with an alcohol in the presence of a halogen, a halogen-containing metal compound, or the like. These dialkoxymagnesiums may be used either alone or in combination.

The dialkoxymagnesium that may preferably be used for the method for producing the solid catalyst component (A) may be granular or powdery, and may have an amorphous shape or a spherical shape. For example, when using a spherical dialkoxymagnesium, the resulting polymer powder has a more excellent particle shape and a narrower particle size distribution. This improves the handling capability of the polymer powder during polymerization, and eliminates a problem (e.g., clogging) due to a fine powder included in the polymer powder.

The spherical dialkoxymagnesium need not necessarily be completely spherical, but may be oval or potato-shaped. The ratio (l/w) of the major axis diameter l to the minor axis diameter w of the spherical dialkoxymagnesium is 3 or less, preferably 1 to 2, and more preferably 1 to 1.5.

The dialkoxymagnesium may have an average particle size of 1 to 200 μm. The average particle size of the dialkoxymagnesium is preferably 5 to 150 μm. The average particle size of the spherical dialkoxymagnesium is 1 to 100 μm, preferably 5 to 50 μm, and more preferably 10 to 40 μm. It is desirable to use a spherical dialkoxymagnesium that has a narrow particle size distribution, and has a low fine powder/coarse powder ratio. Specifically, it is preferable to use a spherical dialkoxymagnesium having a content of particles having a particle size of 5 μm or less of 20% or less, and preferably 10% or less. It is preferable to use a spherical dialkoxymagnesium having a content of particles having a particle size of 100 μm or more of 10% or less, and preferably 5% or less. The particle size distribution ln(D90/D10) (where, D90 is the particle size at 90% in the cumulative particle size distribution, and D10 is the particle size at 10% in the cumulative particle size distribution) of the spherical dialkoxymagnesium is preferably 3 or less, and more preferably 2 or less.

A method for producing such a spherical dialkoxymagnesium is disclosed in JP-A-58-41832, JP-A-62-51633, JP-A-3-74341, JP-A-4-368391, JP-A-8-73388, and the like.

The tetravalent titanium halide compound used in the step I (hereinafter may be referred to as "titanium halide compound (b)") is one compound or two or more compounds selected from a titanium halide or an alkoxytitanium halide represented by $Ti(OR^{13})_nX_{4-n}$ (wherein $R^{13}$ is an alkyl group having 1 to 4 carbon atoms, X is a halogen atom (e.g., chlorine atom, bromine atom, or iodine atom), and n is an integer from 0 to 3).

Examples of the titanium halide include titanium tetrahalides such as titanium tetrachloride, titanium tetrabromide, and titanium tetraiodide. Examples of the alkoxytitanium halide include methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, tri-n-butoxytitanium chloride, and the like. Among these, titanium tetrahalides are preferable, and titanium tetrachloride is particularly preferable. These titanium compounds may be used either alone or in combination.

The electron donor compound represented by the general formula (1) used in the step I (hereinafter may be referred to as "electron donor compound (c)") is a phthalic diester and/or a substituted phthalic diester. Examples of the substituted phthalic diester include a halogen-substituted phthalic diester, an alkyl-substituted phthalic diester, and a haloalkyl-substituted phthalic diester.

Examples of the alkyl group having 1 to 8 carbon atoms represented by $R^1$ in the general formula (1) include a methyl group, an ethyl group, an n-propyl group, an isopropyl group, an n-butyl group, an isobutyl group, a t-butyl group, an n-pentyl group, an isopentyl group, a neopentyl group, an n-hexyl group, an isohexyl group, a 2,2-dimethylbutyl group, a 2,2-dimethylpentyl group, an isooctyl group, and a 2,2-dimethylhexyl group. Examples of the halogen atom represented by R' include a fluorine atom, a chlorine atom, a bromine atom, and an iodine atom. R' is preferably a methyl group, a bromine atom, or a fluorine atom, and more preferably a methyl group or a bromine atom.

Examples of the alkyl group having 1 to 12 carbon atoms represented by $R^2$ and $R^3$ in the general formula (1) include a methyl group, an ethyl group, an n-propyl group, an isopropyl group, an n-butyl group, an isobutyl group, a t-butyl group, an n-pentyl group, an isopentyl group, a neopentyl group, an n-hexyl group, an isohexyl group, a 2,2-dimethylbutyl group, a 2,2-dimethylpentyl group, an isooctyl group, a 2,2-dimethylhexyl group, an n-nonyl group, an isononyl group, an n-decyl group, an isodecyl group, and an n-dodecyl group. Among these, an ethyl group, an n-butyl group, an isobutyl group, a t-butyl group, a neopentyl group, an isohexyl group, and an isooctyl group are preferable, and an ethyl group, an n-butyl group, and a neopentyl group are particularly preferable.

k that is the number of substituents $R^1$ is 0, 1, or 2, $R^1$ are either identical or different when k is 2. In this case, it is preferable $R^1$ substitute the hydrogen atoms at the positions 4 and 5 of the benzene ring in the general formula (1). When k is 1, it is preferable $R^1$ substitutes the hydrogen atom at the position 3, 4, or 5 of the benzene ring in the general formula (1).

Specific examples of the phthalic diester include dimethyl phthalate, diethyl phthalate, di-n-propyl phthalate, diisopropyl phthalate, di-n-butyl phthalate, diisobutyl phthalate, ethylmethyl phthalate, methyl(isopropyl) phthalate, ethyl(n-propyl) phthalate, ethyl(n-butyl) phthalate, ethyl(isobutyl) phthalate, di-n-pentyl phthalate, diisopentyl phthalate, dineopentyl phthalate, dihexyl phthalate, di-n-heptyl phthalate, di-n-octyl phthalate, bis(2,2-dimethylhexyl) phthalate, bis(2-ethylhexyl) phthalate, di-n-nonyl phthalate, diisodecyl phthalate, bis(2,2-dimethylheptyl) phthalate, n-butyl(isohexyl) phthalate, n-butyl(2-ethylhexyl) phthalate, n-pentyl(hexyl) phthalate, n-pentyl(isohexyl) phthalate, isopentyl(heptyl) phthalate, n-pentyl(2-ethylhexyl) phthalate, n-pentyl(isononyl) phthalate, isopentyl(n-decyl) phthalate, n-pentyl(undecyl) phthalate, isopentyl(isohexyl) phthalate, n-hexyl(2,2-dimethylhexyl) phthalate, n-hexyl(2-ethylhexyl) phthalate, n-hexyl(isononyl) phthalate, n-hexyl(n-decyl) phthalate, n-heptyl(2-ethylhexyl) phthalate, n-heptyl(isononyl) phthalate, n-heptyl(neodecyl) phthalate, and 2-ethylhexyl(isononyl) phthalate. These compounds may be used either alone or in combination.

Specific examples of the substituted phthalic diester include diethyl 4-methylphthalate, di-n-butyl 4-methylphthalate, diisobutyl 4-methylphthalate, dineopentyl 4-bromophthalate, diethyl 4-bromophthalate, di-n-butyl 4-bromophthalate, diisobutyl 4-bromophthalate, dineopentyl 4-methylphthalate, dineopentyl 4,5-dimethylphthalate, dineopentyl 4-methylphthalate, dineopentyl 4-ethylphthalate, t-butylneopentyl 4-methylphthalate, t-butylneopentyl 4-ethylphthalate, dineopentyl 4,5-dimethylphthalate, dineopentyl 4,5-diethylphthalate, t-butylneopentyl 4,5-dimethylphthalate, t-butylneopentyl 4,5-diethylphthalate, dineopentyl 3-fluorophthalate, dineopentyl 3-chlorophthalate, dineopentyl 4-chlorophthalate, and dineopentyl 4-bromophthalate.

The above esters may preferably be used in combination. In this case, the esters are preferably combined so that the total number of carbon atoms of the alkyl group(s) of one ester differs from that of another ester by 4 or more.

In the step I, a polysiloxane may be used when bringing the magnesium compound (a), the titanium halide compound (b), and the electron donor compound (c) into contact with each other. A polysiloxane is a polymer that includes a siloxane linkage (—Si—O—) in the main chain, and is also referred to as "silicone oil". The polysiloxane may be a chain-like, partially hydrogenated, cyclic, or modified polysiloxane that is liquid or viscous at room temperature, and has a viscosity at 25° C. of 0.02 to 100 cm$^2$/s (2 to 10,000 cSt), and preferably 0.03 to 5 cm$^2$/s (3 to 500 cSt).

Examples of the chain-like polysiloxane include disiloxanes such as hexamethyldisiloxane, hexaethyldisiloxane, hexapropyldisiloxane, hexaphenyldisiloxane, 1,3-divinyltetramethyldisiloxane, 1,3-dichlorotetramethyldisiloxane, 1,3-dibromotetramethyldisiloxane, chloromethylpentamethyldisiloxane, 1,3-bis(chloromethyl)tetramethyldisiloxane, dimethylpolysiloxane, and methylphenylpolysiloxane. Examples of the partially hydrogenated polysiloxane include methyl hydrogen polysiloxane having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include a higher fatty acid group-substituted dimethylsiloxane, an epoxy group-substituted dimethylsiloxane, and a polyoxyalkylene group-substituted dimethylsiloxane. Among these, decamethylcyclopentasiloxane and dimethylpolysiloxane are preferable, and decamethylcyclopentasiloxane is particularly preferable.

In the step I, the components are brought into contact with each other with stirring in a vessel equipped with a stirrer that contains an inert gas atmosphere from which water and the like have been removed. The contact temperature may be the same as the reaction temperature, or may differ from the reaction temperature. The components may be brought into contact with each other at a relatively low temperature around room temperature when the components are brought into contact with each other by stirring and mixing the components, or dispersing or suspending the components to effect modification. The components brought into contact with each other are preferably reacted at 40 to 130° C. from the viewpoint of the reaction rate and ease of reaction control. The reaction time is 1 minute or more, preferably 10 minutes or more, and still more preferably 30 minutes or more.

In the step I, it is preferable to bring the magnesium compound (a), the titanium halide compound (b), and the electron donor compound (c) into contact with each other in the presence of a hydrocarbon compound having a boiling point of 50 to 150° C. (hereinafter may be referred to as "hydrocarbon compound (e)").

The hydrocarbon compound (e) is preferably an aromatic hydrocarbon compound or a saturated hydrocarbon compound that is liquid at room temperature. Specific examples of the hydrocarbon compound (e) include linear or branched aliphatic hydrocarbon compounds having a boiling point of 50 to 150° C., such as hexane, heptane, decane, and methylheptane, alicyclic hydrocarbon compounds having a boiling point of 50 to 150° C., such as cyclohexane and ethylcyclohexane, and aromatic hydrocarbon compounds having a boiling point of 50 to 150° C., such as toluene, xylene, and ethylbenzene. Among these, aromatic hydrocarbon compounds having a boiling point of 50 to 150° C. are preferable since the activity of the resulting solid catalyst component and the stereoregularity of the resulting polymer can be improved. These compounds may be used either alone or in combination.

In the step I, a reaction product (solid component) obtained by reacting the magnesium compound (a), the titanium halide compound (b), and the electron donor compound (c) is washed (intermediate washing) with a washing agent (hereinafter may be referred to as "washing agent (f)") to obtain a washed solid component. The washing (intermediate washing) in the step I is performed to remove a reaction by-product (impurity), an unreacted titanium halide compound (b), and an excess electron donor compound (c). It is preferable to use a hydrocarbon compound having a boiling point of 50 to 150° C. as the washing agent (f). Examples of the hydrocarbon compound having a boiling point of 50 to 150° C. include those mentioned above in connection with the hydrocarbon compound (e). It is preferable to use an aromatic hydrocarbon compound due to a high impurity washing effect, for example.

The intermediate washing temperature is 0 to 110° C., preferably 30 to 100° C., and particularly preferably 30 to 90° C. The intermediate washing is performed 1 to 20 times, preferably 1 to 15 times, and particularly preferably 1 to 10 times.

In the step I, the components may be bought into contact with each other in the following order, for example.

(1) (a)→(e)→(b)→(c)→<<washing→(e)→(b)>>→intermediate washing→solid component (2) (a)→(e)→(c)→(b)→<<washing→(e)→(b)>>→intermediate washing→solid component (3) (a)→(e)→(b)→(c)→<<washing→(e)→(b)→(c)>>→intermediate washing→solid component (4) (a)→(e)→(b)→(c)→<<washing→(e)→(c)→(b)>>→intermediate washing→solid component (5) (a)→(e)→(c)→(b)→<<washing→(e)→(b)→(c)>>→intermediate washing→solid component (6) (a)→(e)→(c)→(b)→<<washing→(e)→(c)→(b)>>→intermediate washing→solid component When successively adding the electron donor compound (c) and the titanium halide compound (b), the electron donor compound (c) and the titanium halide compound (b) may be mixed in advance, and may then be added. Note that the activity of the resulting solid catalyst component is improved by optionally repeating the operation in double parentheses a plurality of times. The component (b) used in the operation in double parentheses may be newly added, or may be a residue from the previous step. The product obtained in each contact step may be washed with a hydrocarbon compound that is liquid at room temperature in addition to the above washing step (see (1) to (6)).

It is particularly preferable to perform the step I as described below. Specifically, the spherical dialkoxymagnesium (a) is suspended in the hydrocarbon compound (e) having a boiling point of 50 to 150° C. to obtain a suspension. The tetravalent titanium halide compound (b) is brought into contact with the suspension, and the mixture is reacted. In this case, one or more electron donor compounds (c) are brought into contact with the suspension at −20 to 130° C. before or after bringing the tetravalent titanium halide compound (b) into contact with the suspension to obtain a solid reaction product (1). It is preferable to effect an aging reaction at a low temperature before or after bringing the electron donor compound (c) into contact with the suspension. After washing the solid reaction product (1) with the washing agent (f) that is a hydrocarbon compound that is liquid at room temperature, the tetravalent titanium halide compound (b) is brought into contact with the solid reaction product (1) in the presence of the hydrocarbon compound (e) at −20 to 100° C., and the mixture is reacted to obtain a solid reaction product (2). The solid reaction product (2) is washed with the washing agent (f) that is a hydrocarbon compound that is liquid at room temperature to obtain a solid component. It is preferable that the solid reaction product (2) be in a wet state in which the supernatant liquid has been almost completely removed. The intermediate washing and the reaction may optionally be repeated a plurality of times.

Since the spherical magnesium compound is used as the magnesium compound (a), it is possible to obtain a spherical solid catalyst component having a sharp particle size distribution. Note that a spherical solid catalyst component having a sharp particle size distribution can also be obtained without using a spherical magnesium compound by forming particles using a spray dry method that sprays and dries a solution or a suspension using a sprayer, for example.

It is preferable to employ the following reaction/washing conditions. Low-temperature aging reaction: −20 to 70° C. (preferably −10 to 60° C., and more preferably 0 to 30° C.) for 1 minute to 6 hours (preferably 5 minutes to 4 hours, and particularly preferably 10 minutes to 3 hours)

Reaction: 0 to 130° C. (preferably 40 to 120° C., and particularly preferably 50 to 115° C.) for 0.5 to 6 hours (preferably 0.5 to 5 hours, and particularly preferably 1 to 4 hours)

Washing: 0 to 110° C. (preferably 30 to 100° C., and particularly preferably 30 to 90° C.) 1 to 20 times (preferably 1 to 15 times, and particularly preferably 1 to 10 times)

The step II is described below. In the step II, the solid component obtained by the step I, a tetravalent titanium halide compound (g), and an electron donor compound represented by the general formula (2) (hereinafter may be referred to as "electron donor compound (d)") are brought into contact with each other, the solid component, the tetravalent titanium halide compound (g), and the electron donor compound (d) are reacted to obtain a reaction product, and the reaction product is washed to obtain a solid catalyst component.

The solid component obtained by the step I may be the solid component that has not been dried after the intermediate washing, or may be the solid component that has been dried using a hot-blast dryer or the like after the intermediate washing. The solid component that has not been dried after the intermediate washing is in a wet state due to the washing agent. It is preferable to use the solid component that is suspended in a large amount of the washing agent since a drying step can be omitted as far as possible, and the washing agent can be used as a reaction solvent in the step II.

The tetravalent titanium halide compound (g) used in the step II is the same as the tetravalent titanium halide compound (b) used in the step I, and description thereof is omitted.

The electron donor compound represented by the general formula (2) used in the step II (electron donor compound (d)) is a malonic diester and/or a substituted malonic diester. Examples of the substituted malonic diester include a halogen-substituted malonic diester, an alkyl-substituted malonic diester, and a haloalkyl-substituted malonic diester.

Examples of the halogen atom represented by $R^4$ and $R^5$ in the general formula (2) include a chlorine atom, a bromine atom, an iodine atom, and a fluorine atom. Among these, a chlorine atom and a bromine atom are preferable.

Examples of the linear alkyl group having 1 to 20 carbon atoms and the branched alkyl group having 3 to 20 carbon atoms represented by $R^4$ and $R^5$ include a methyl group, an ethyl group, an n-propyl group, an isopropyl group, an n-butyl group, an isobutyl group, a t-butyl group, an n-pentyl group, an isopentyl group, a neopentyl group, an n-hexyl group, an isohexyl group, a 2,2-dimethylbutyl group, a 2,2-dimethylpentyl group, an isooctyl group, a 2,2-dimethylhexyl group, an n-nonyl group, an isononyl group, an n-decyl group, an isodecyl group, and an n-dodecyl group.

Examples of the linear halogen-substituted alkyl group having 1 to 20 carbon atoms and the branched halogen-substituted alkyl group having 3 to 20 carbon atoms represented by $R^4$ and $R^5$ include a methyl halide group, an ethyl halide group, an n-propyl halide group, an isopropyl halide group, an n-butyl halide group, an isobutyl halide group, an n-pentyl halide group, an n-hexyl halide group, an n-heptyl halide group, an n-octyl halide group, a nonyl halide group, and a decyl halide group. Examples of the halogen include fluorine, chlorine, bromine, and iodine.

Examples of the cycloalkyl group represented by $R^4$ and $R^5$ include a cyclopropyl group, a cyclobutyl group, a cyclopentyl group, a cyclohexyl group, a cycloheptyl group, a cyclooctyl group, a cyclononyl group, a cyclodecyl group, and the like.

Examples of the aromatic hydrocarbon group represented by $R^4$ and $R^5$ include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, and the like. Among these, a branched alkyl group having 3 to 10 carbon atoms is preferable, and an isobutyl group, a t-butyl group, an isopentyl group, and a neopentyl group are particularly preferable.

Examples of the linear alkyl group having 1 to 20 carbon atoms and the branched alkyl group having 3 to 20 carbon atoms represented by $R^6$ (i.e., an ester residue of carbonyl) in the general formula (2) include a methyl group, an ethyl group, an n-propyl group, an isopropyl group, an n-butyl group, an isobutyl group, a t-butyl group, an n-pentyl group, an isopentyl group, a neopentyl group, an n-hexyl group, an isohexyl group, a 2,2-dimethylbutyl group, a 2,2-dimethylpentyl group, an isooctyl group, a 2,2-dimethylhexyl group, an n-nonyl group, an isononyl group, an n-decyl group, an isodecyl group, and an n-dodecyl group.

Examples of the cycloalkyl group having 3 to 20 carbon atoms represented by $R^6$ include a cyclopropyl group, a cyclobutyl group, a cyclopentyl group, a cyclohexyl group, a cycloheptyl group, a cyclooctyl group, a cyclononyl group, a cyclodecyl group, and the like.

Examples of the aromatic hydrocarbon group represented by $R^6$ include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, and the like.

$R^6$ in the general formula (2) is preferably a linear alkyl group having 1 to 8 carbon atoms or a branched alkyl group having 3 to 8 carbon atoms, such as a methyl group, an ethyl group, an n-propyl group, an isopropyl group, an n-butyl group, an isobutyl group, a t-butyl group, a pentyl group, an isopentyl group, or a neopentyl group.

Specific examples of the malonic diester include dimethyl malonate, diethyl malonate, di-n-propyl malonate, di-n-butyl malonate, diisobutyl malonate, di-n-pentyl malonate, dineopentyl malonate, and the like.

Specific examples of the halogen-substituted malonic diester include dimethyl chloromalonate, diethyl chloromalonate, dimethyl dichloromalonate, diethyl dichloromalonate, dimethyl bromomalonate, diethyl bromomalonate, dimethyl dibromomalonate, diethyl dibromomalonate, di-n-propyl chloromalonate, di-n-propyl dichloromalonate, di-n- propyl bromomalonate, di-n-propyl dibromomalonate, di-n-butyl chloromalonate, di-n-butyl dichloromalonate, di-n-butyl bromomalonate, di-n-butyl dibromomalonate, diisobutyl chloromalonate, diisobutyl dichloromalonate, diisobutyl bromomalonate, diisobutyl dibromomalonate, di-n-pentyl chloromalonate, di-n-pentyl dichloromalonate, di-n-pentyl bromomalonate, di-n-pentyl dibromomalonate, dineopentyl chloromalonate, dineopentyl dichloromalonate, dineopentyl bromomalonate, dineopentyl dibromomalonate, diisooctyl chloromalonate, diisooctyl dichloromalonate, diisooctyl bromomalonate, diisooctyl dibromomalonate, and the like.

Specific examples of the alkyl and halogen-substituted malonic diester and the halogen-substituted malonic diester include dimethyl ethylchloromalonate, dimethyl ethylbromomalonate, dimethyl isopropylchloromalonate, dimethyl isopropylbromomalonate, dimethyl n-butylchloromalonate, dimethyl n-butylbromomalonate, dimethyl isobutylchloromalonate, dimethyl isobutylbromomalonate, diethyl n-butylchloromalonate, diethyl n-butylbromomalonate, diethyl isobutylchloromalonate, diethyl isobutylbromomalonate, di-n-butyl ethylchloromalonate, di-n-butyl ethylbromomalonate, di-n-butyl isopropylchloromalonate, di-n-butyl isopropylbromomalonate, diisobutyl isopropylchloromalonate, diisobutyl isopropylbromomalonate, dineopentyl isopropylchloromalonate, dineopentyl isopropylbromomalonate, and the like.

Specific examples of the alkyl-substituted malonic diester include dimethyl isopropylmalonate, diethyl isopropylmalonate, di-n-propyl isopropylmalonate, diisopropyl isopropylmalonate, di-n-butyl isopropylmalonate, diisobutyl isopropylmalonate, dineopentyl isopropylmalonate, dimethyl isobutylmalonate, diethyl isobutylmalonate, di-n-propyl isobutylmalonate, diisopropyl isobutylmalonate, di-n-butyl isobutylmalonate, diisobutyl isobutylmalonate, dineopentyl isobutylmalonate, dimethyl isopentylmalonate, diethyl isopentylmalonate, di-n-propyl isopentylmalonate, diisopropyl isopentylmalonate, di-n-butyl isopentylmalonate, diisobutyl isopentylmalonate, dineopentyl isopentylmalonate, dimethyl diisopropylmalonate, diethyl diisopropylmalonate, di-n-propyl diisopropylmalonate, diisopropyl diisopropylmalonate, di-n-butyl diisopropylmalonate, diisobutyl diisopropylmalonate, dineopentyl diisopropylmalonate, dimethyl diisobutylmalonate, diethyl diisobutylmalonate, di-n-propyl diisobutylmalonate, diisopropyl diisobutylmalonate, di-n-butyl diisobutylmalonate, diisobutyl diisobutylmalonate, dineopentyl diisobutylmalonate, dimethyl diisopentylmalonate, diethyl diisopentylmalonate, di-n-propyl diisopentylmalonate, diisopropyl diisopentylmalonate, di-n-butyl diisopentylmalonate, diisobutyl diisopentylmalonate, dineopentyl diisopentylmalonate, dimethyl isopropylisobutylmalonate, diethyl isopropylisobutylmalonate, di-n-propyl isopropylisobutylmalonate, diisopropyl isopropylisobutylmalonate, di-n-butyl isopropylisobutylmalonate, diisobutyl isopropylisobutylmalonate, dineopentyl isopropylisobutylmalonate, dimethyl isopropylisopentylmalonate, diethyl isopropylisopentylmalonate, di-n-propyl isopropylisopentylmalonate, diisopropyl isopropylisopentylmalonate, di-n-butyl isopropylisopentylmalonate, diisobutyl isopropylisopentylmalonate, dineopentyl isopropylisopentylmalonate, and the like.

Specific examples of the haloalkyl-substituted malonic diester include dimethyl bis(chloromethyl)malonate, dimethyl bis(bromomethyl)malonate, dimethyl bis(chloroethyl)malonate, dimethyl bis(bromoethyl)malonate, dimethyl bis(3-chloro-n-propyl)malonate, diethyl bis(3-bromo-n-propyl)malonate, diethyl bis(chloromethyl)malonate, diethyl bis(bromomethyl)malonate, diethyl bis(chloroethyl)malonate, diethyl bis(bromoethyl)malonate, diethyl bis(3-chloro-n-propyl)malonate, diethyl bis(3-bromo-n-propyl)malonate, and the like.

Among these, dimethyl isopropylbromomalonate, dimethyl butylbromomalonate, dimethyl isobutylbromomalonate, dimethyl isopropylmalonate, dimethyl butylmalonate, dimethyl isobutylmalonate, dimethyl isopentylmalonate, dimethyl diisopropylmalonate, dimethyl dibutylmalonate, dimethyl diisobutylmalonate, dimethyl diisopentylmalonate, dimethyl isopropylisobutylmalonate, dimethyl isopropylisopentylmalonate, dimethyl bis(3-chloro-n-propyl)malonate, dimethyl bis(3-bromo-n-propyl)malonate, diethyl isopropylbromomalonate, diethyl butylbromomalonate, diethyl isobutylbromomalonate, diethyl isopropylmalonate, diethyl butylmalonate, diethyl isobutylmalonate, diethyl isopentylmalonate, diethyl diisopropylmalonate, diethyl dibutylmalonate, diethyl diisobutylmalonate, diethyl diisopentylmalonate, diethyl isopropylisobutylmalonate, diethyl isopropylisopentylmalonate, diethyl bis(3-chloro-n-propyl)malonate, diethyl bis(3-bromo-n-propyl)malonate are preferable. These electron donor compounds (d) may be used either alone or in combination.

In the step II, the solid component, the tetravalent titanium halide compound (g), and the electron donor compound (d) are brought into contact with each other with stirring in a vessel equipped with a stirrer that contains an inert gas atmosphere from which water and the like have been removed. The contact temperature, the reaction temperature, the reaction time, and the like may be the same as those mentioned above in connection with the step I.

In the step II, it is preferable to bring the solid component obtained by the step I, the tetravalent titanium halide compound (g), and the electron donor compound (d) into contact with each other in the presence of a hydrocarbon compound having a boiling point of 50 to 150° C. (hereinafter may be referred to as "hydrocarbon compound (h)"). The hydrocarbon compound (h) is the same as the hydrocarbon compound (e) used in the step I, and description thereof is omitted.

In the step II, it is preferable to bring the tetravalent titanium halide compound (g) and the electron donor compound (d) into contact with the solid component obtained by the step I that includes the electron donor compound (c) in the presence of the hydrocarbon compound (h) at −20 to 100° C., react the mixture, and wash (final washing) the reaction product with the washing agent (i) that is a hydrocarbon compound that is liquid at room temperature. The reaction product is washed in the step II in order to remove a reaction by-product (impurity) produced in the step II, an unreacted component (g), and an excess electron donor compound (d). The washing agent (i) is the same as the washing agent (f) used in the step I, and description thereof is omitted. It is preferable to use a saturated hydrocarbon compound as the washing agent (i) used in the step II since a saturated hydrocarbon compound can efficiently dissolve a reaction by-product produced in the step II, an unreacted tetravalent titanium halide compound (g), and an excess electron donor compound (d), and can be easily handled.

In the step II, the titanium halide compound (g) and the electron donor compound (d) may be added separately, or may be mixed in advance, and may then be added. The washing (final washing) temperature is 0 to 110° C., preferably 30 to 100° C., and particularly preferably 30 to 90° C. The washing (final washing) is performed 1 to 20 times, preferably 1 to 15 times, and particularly preferably 1 to 10 times.

The solid catalyst component (A) obtained by the step II ensures high activity with respect to hydrogen and production of a polymer having high stereoregularity as compared with a solid catalyst component obtained using only one of the above electron donor compounds, or a solid catalyst component obtained by bringing a mixture of the above electron donor compounds without performing the intermediate washing step.

The ratio of the components used when producing the solid catalyst component (A) is determined depending on the production method. For example, the tetravalent titanium halide compound (b) is used in an amount of 0.5 to 100 mol, preferably 0.5 to 50 mol, and more preferably 1 to 10 mol, based on 1 mol of the dialkoxymagnesium (a). The electron donor compound (c) is used in an amount of 0.01 to 10 mol, preferably 0.01 to 1 mol, and more preferably 0.02 to 0.6 mol, based on 1 mol of the dialkoxymagnesium (a). The electron donor compound (d) is used in an amount of 0.01 to 10 mol, preferably 0.01 to 1 mol, and more preferably 0.02 to 0.6 mol, based on 1 mol of the dialkoxymagnesium (a). The aromatic hydrocarbon compound (e) is used in an amount of 0.001 to 500 mol, preferably 0.001 to 100 mol, and more preferably 0.005 to 10 mol, based on 1 mol of the dialkoxymagnesium (a).

The content of titanium, magnesium, the halogen atom, and the electron donor compound in the solid catalyst component (A) is not particularly limited. The content of titanium in the solid catalyst component (A) is 0.5 to 8.0 wt %, preferably 0.5 to 5.0 wt %, and more preferably 0.5 to 2.0 wt %. The content of magnesium in the solid catalyst component (A) is 10 to 70 wt %, preferably 10 to 50 wt %, more preferably 15 to 40 wt %, and particularly preferably 15 to 25 wt %. The content of the halogen atom in the solid catalyst component (A) is 20 to 88 wt %, preferably 30 to 85 wt %, more preferably 40 to 80 wt %, and particularly preferably 45 to 75 wt %. The total content of the electron donor compound (c) in the solid catalyst component (A) is 0.5 to 30 wt %, preferably 1 to 25 wt %, and particularly preferably 2 to 20 wt %. The total content of the electron donor compound (d) in the solid catalyst component (A) is 0.5 to 30 wt %, preferably 1 to 25 wt %, and particularly preferably 2 to 20 wt %.

In order to ensure the solid catalyst component (A) produced using the electron donor compound and the like exhibits well-balanced overall performance, it is preferable that the content of titanium be 0.5 to 2.0 wt %, the content of magnesium be 15 to 25 wt %, the content of the halogen atom be 45 to 75 wt %, the content of electron donor compound (c) be 2 to 20 wt %, and the content of electron donor compound (d) be 2 to 20 wt %.

An olefin polymerization catalyst according to one embodiment of the invention is produced by bringing (I) the solid catalyst component (A), (II) an organoaluminum compound represented by the general formula (3) (hereinafter may be referred to as "organoaluminum compound (B)"), and (III) an external electron donor compound (hereinafter may be referred to as "external electron donor compound (C)") into contact with each other. An olefin can be polymerized or copolymerized in the presence of the olefin polymerization catalyst.

Specific examples of the organoaluminum compound (B) include triethylaluminum, diethylaluminum chloride, triisobutylaluminum, diethylaluminum bromide, tri-n-hexylaluminum, and the like. These compounds may be used either alone or in combination. It is preferable to use triethylaluminum or triisobutylaluminum.

Examples of the external electron donor compound (C) include organic compounds that include an oxygen atom or a nitrogen atom. Examples of the organic compounds that include an oxygen atom or a nitrogen atom include alcohols, phenols, ethers, esters, ketones, acid halides, aldehydes, amines, amides, nitriles, isocyanates, and organosilicon compounds. The external electron donor compound (C) may be an organosilicon compound that includes an Si—O—C linkage, an aminosilane compound that includes an Si—N—C linkage, or the like.

Among these, esters such as ethyl benzoate, ethyl p-methoxybenzoate, ethyl p-ethoxybenzoate, methyl p-toluate, ethyl p-toluate, methyl anisate, and ethyl anisate, 1,3-diethers, organosilicon compounds that include an Si—O—C linkage, and aminosilane compounds that include an Si—N—C linkage are preferable, and organosilicon compounds that include an Si—O—C linkage, and aminosilane compounds that include an Si—N—C linkage are particularly preferable.

Examples of the organosilicon compounds that include an Si—O—C linkage and may be used as the external electron donor compound (III) include an organosilicon compound represented by the following general formula (4).

$$R^8_q Si(OR^9)_{4-q} \quad (4)$$

wherein $R^8$ is an alkyl group having 1 to 12 carbon atoms, a cycloalkyl group having 3 to 12 carbon atoms, a phenyl group, a vinyl group, an allyl group, or an aralkyl group, provided that a plurality of $R^8$ are either identical or different when a plurality of $R^8$ are present, $R^9$ is an alkyl group having 1 to 4 carbon atoms, a cycloalkyl group having 3 to 6 carbon atoms, a phenyl group, a vinyl group, an allyl group, or an aralkyl group, provided that a plurality of $R^9$ are either identical or different when a plurality of $R^9$ are present, and q is an integer from 0 to 3.

Examples of the aminosilane compounds that include an Si—N—C linkage and may be used as the external electron donor compound (III) include an aminosilane compound represented by the following general formula (5).

$$(R^{10}R^{11}N)_s SiR^{12}_{4-s} \quad (5)$$

wherein $R^{10}$ and $R^{11}$ are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group, provided that $R^{10}$ and $R^{11}$ are either identical or different, and optionally bond to each other to form a ring, $R^{12}$ is a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, or an aryloxy group, provided that a plurality of $R^{12}$ are either identical or different when a plurality of $R^{12}$ are present, and s is an integer from 1 to 3.

Examples of the organosilicon compound include phenylalkoxysilanes, alkylalkoxysilanes, phenylalkylalkoxysilanes, cycloalkylalkoxysilanes, alkyl(cycloalkyl)alkoxysilanes, (alkylamino)alkoxysilanes, alkyl(alkylamino)alkoxysilanes, cycloalkyl(alkylamino)alkoxysilanes, tetraalkoxysilanes, tetrakis(alkylamino)silanes, alkyltris(alkylamino)silanes, dialkylbis(alkylamino)silanes, trialkyl(alkylamino)silanes, and the like. Specific examples of the organosilicon compound include phenyltrimethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimetoxysilane, cyclohexylcyclopentyldimethoxysilane, cyclohexylmethyldimethoxysilane, tetraethoxysilane, tetrabutoxysilane, bis(ethylamino)methylethylsilane, t-butylmethylbis(ethylamino)silane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, and the like. Among these, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, diethylaminotriethoxysilane, and the like are preferable.

The external electron donor compound (III) may be one compound or two or more compounds selected from the organosilicon compound represented by the general formula (4) and the organosilicon compound represented by the general formula (5).

In one embodiment of the invention, an olefin is polymerized or copolymerized in the presence of the olefin polymerization catalyst. Examples of the olefin include ethylene, propylene, 1-butene, 1-pentene, 4-methyl-1-pentene, vinylcyclohexane, and the like. These olefins may be used either alone or in combination. Among these, ethylene, propylene, and 1-butene are preferable. Note that propylene is particularly preferable. When polymerizing propylene, propylene may be copolymerized with another olefin. Examples of the olefin copolymerized with propylene include ethylene, 1-butene, 1-pentene, 4-methyl-1-pentene, vinylcyclohexane, and the like. These olefins may be used either alone or in combination. Among these, ethylene and 1-butene are preferable.

The ratio of each component is not particularly limited as long as the advantageous effects of the invention are not adversely affected. The organoaluminum compound (B) is normally used in an amount of 1 to 2000 mol, and preferably 50 to 1000 mol, per mol of the titanium atoms included in the solid catalyst component (A). The external electron donor compound (C) is used in an amount of 0.002 to 10 mol, preferably 0.01 to 2 mol, and particularly preferably 0.01 to 0.5 mol, per mol of the organoaluminum compound (B).

The components may be brought into contact with each other in an arbitrary order. It is preferable to add the organoaluminum compound (B) to the polymerization system, bring the external electron donor compound (C) into contact with the organoaluminum compound (B), and bring the solid catalyst component (A) into contact with the mixture.

The olefin may be polymerized in the presence or absence of an organic solvent. The olefin monomer such as propylene may be used either in a gaseous state or a liquid state. The polymerization temperature is 200° C. or less, and preferably 100° C. or less. The polymerization pressure is 10 MPa or less, and preferably 5 MPa or less. A continuous polymerization method or a batchwise polymerization method may be used. The polymerization reaction may be effected in one step, or may be effected in two or more steps.

When polymerizing the olefin using the catalyst that includes the solid catalyst component (A), the organoaluminum compound (B), and the external electron donor compound (C) (hereinafter may be referred to as "main polymerization"), it is desirable to effect preliminary polymerization prior to the main polymerization in order to further improve the catalytic activity, the stereoregularity, the properties of the resulting polymer particles, and the like. The olefin that is subjected to the main polymerization or a monomer such as styrene may be used for the preliminary polymerization.

The components and the monomer may be brought into contact with each other in an arbitrary order during the preliminary polymerization. Note that it is preferable to add the organoaluminum compound (B) to the preliminary polymerization system containing an inert gas atmosphere or an olefin gas atmosphere, bring the solid catalyst component (A) into contact with the organoaluminum compound (B), and then bring the olefin (e.g., propylene) and/or one or more additional olefins into contact with the mixture. When effecting the preliminary polymerization using the external electron donor compound (C) in combination, it is desirable to add the organoaluminum compound (B) to the preliminary polymerization system containing an inert gas atmosphere or an olefin gas atmosphere, bring the external electron donor compound (C) into contact with the organoaluminum compound (B), bring the solid catalyst component (A) into contact with the mixture, and then bring the olefin (e.g., propylene) and/or one or more additional olefins into contact with the mixture.

When an olefin is polymerized in the presence of the olefin polymerization catalyst, it is possible to achieve a high activity with respect to hydrogen, and obtain a polymer having high stereoregularity as compared with the case of using a known catalyst.

EXAMPLES

The invention is further described below by way of examples. Note that the following examples are for illustration purposes only, and the invention is not limited to the following examples.

Example 1

Synthesis of Solid Catalyst Component (A1)

A 500 ml round-bottom flask equipped with a stirrer, of which the internal atmosphere had been sufficiently replaced with nitrogen gas, was charged with 20 ml of titanium tetrachloride and 40 ml of toluene to prepare a solution. A suspension prepared by suspending 10 g of spherical diethoxymagnesium (sphericity l/w: 1.10) in 47 ml of toluene was added to the solution. The mixture was stirred at 4° C. for 1 hour. After the addition of 2.7 ml of di-n-butyl phthalate, the mixture was heated to 105° C., and reacted for 2 hours with stirring. After completion of the reaction, the resulting solid product was washed four times with 87 ml of toluene (100° C.). After the addition of 20 ml of titanium tetrachloride and 80 ml of toluene, the mixture was heated to 100° C., and reacted for 2 hours with stirring. After completion of the reaction, the supernatant liquid was removed. The solid product in a wet state was washed four times with 87 ml of toluene (100° C.) to obtain a solid component X (step I). After the addition of 20 ml of titanium tetrachloride, 47 ml of toluene, and 3.3 ml of dimethyl diisobutylmalonate to the solid component X, the mixture was heated to 100° C., and reacted for 2 hours with stirring. After completion of the reaction, the supernatant liquid (toluene) was removed. The solid product in a wet state was washed four times with 87 ml of toluene (100° C.), and washed ten times with 67 ml of n-heptane (40° C.) to obtain a solid catalyst component (A1) (step II). The titanium content in the solid catalyst component was measured, and found to be 1.5 wt %.

Preparation of Polymerization Catalyst and Polymerization

A 2.0 l autoclave equipped with a stirrer, of which the internal atmosphere had been completely replaced with nitrogen gas, was charged with 1.32 mmol of triethylaluminum, 0.13 mmol of dicyclopentyldimethoxysilane (DCPDMS), and the solid catalyst component (A1) (0.0013 mmol on a titanium atom basis) to prepare a polymerization catalyst. After the addition of 9.0 l of hydrogen gas and 1.4 l of liquefied propylene, preliminary polymerization was effected at 20° C. for 5 minutes. The mixture was heated to 70° C., and polymerized for 1 hour. The polymerization activity per gram of the solid catalyst component, the bulk density (BD) of the polymer, the p-xylene-soluble content (XS) in the polymer, and the melt flow rate (MFR) of the polymer are shown in Table 1.

Polymerization Activity Per Gram of Solid Catalyst Component

The polymerization activity per gram of the solid catalyst component was calculated using the following expression.

Polymerization activity (g-pp/g-catalyst)=mass (g) of polymer/mass (g) of solid catalyst component Measurement of Bulk Density of Polymer The bulk density of the polymer was measured in accordance with JIS K 6721.

Measurement of Xylene-Soluble Content (XS) in Polymer

A flask equipped with a stirrer was charged with 4.0 g of the polymer (polypropylene) and 200 ml of p-xylene. The external temperature was increased to be equal to or higher than the boiling point (about 150° C.) of xylene, and the polymer was dissolved over 2 hours while maintaining p-xylene contained in the flask at a temperature (137 to 138° C.) lower than the boiling point. The solution was cooled to 23° C. over 1 hour, and an insoluble component and a soluble component were separated by filtration. A solution of the soluble component was collected, and p-xylene was evaporated by heating and drying under reduced pressure. The weight of the residue (xylene-soluble component) was calculated as a value (wt %) relative to the weight of the polymer (polypropylene), and taken as the xylene-soluble content (XS).

Melt Flow Rate (MFR) of Polymer

The melt flow rate (MFR) (melt flow index) of the polymer was measured in accordance with ASTM D 1238 (JIS K 7210).

Example 2

Synthesis of Solid Catalyst Component (A2)

A solid catalyst component (A2) was prepared in the same manner as in Example 1, except that dimethyl isobutylmalonate was used instead of dimethyl diisobutylmalonate in an equimolar amount.

Preparation of Polymerization Catalyst and Polymerization

A polymerization catalyst was prepared, and polymerization was effected in the same manner as in Example 1, except that the solid catalyst component (A2) was used instead of the solid catalyst component (A1). The titanium content in the solid catalyst component was measured, and found to be 1.6 wt %. The polymerization results are shown in Table 1.

Example 3

Synthesis of Solid Catalyst Component (A3)

A solid catalyst component (A3) was prepared in the same manner as in Example 1, except that diethyl diisobutylmalonate was used instead of dimethyl diisobutylmalonate in an equimolar amount.

Preparation of Polymerization Catalyst and Polymerization

A polymerization catalyst was prepared, and polymerization was effected in the same manner as in Example 1, except that the solid catalyst component (A3) was used instead of the solid catalyst component (A1). The titanium content in the solid catalyst component was measured, and found to be 1.6 wt %. The polymerization results are shown in Table 1.

Comparative Example 1

Synthesis of Solid Catalyst Component (A4)

A 500 ml round-bottom flask equipped with a stirrer, of which the internal atmosphere had been sufficiently replaced with nitrogen gas, was charged with 20 ml of titanium tetrachloride and 40 ml of toluene to prepare a solution. A suspension prepared by suspending 10 g of spherical diethoxymagnesium (sphericity l/w: 1.10) in 47 ml of toluene was added to the solution. The mixture was stirred at 4° C. for 1 hour. After the addition of 2.7 ml of di-n-butyl phthalate, the mixture was heated to 105° C., and reacted for 2 hours with stirring. After completion of the reaction, the resulting solid product was washed four times with 87 ml of toluene (100° C.). After the addition of 20 ml of titanium tetrachloride and 80 ml of toluene, the mixture was heated to 100° C., and reacted for 2 hours with stirring. After completion of the reaction, the mixture was washed ten times with 67 ml of n-heptane (40° C.) to obtain a solid catalyst component (A4). The titanium content in the solid catalyst component was measured, and found to be 2.6 wt %.

Preparation of Polymerization Catalyst and Polymerization

A polymerization catalyst was prepared, and polymerization was effected in the same manner as in Example 1, except that the solid catalyst component (A4) was used instead of the solid catalyst component (A1). The polymerization results are shown in Table 1.

Example 4

Synthesis of Solid Catalyst Component (A5)

A 500 ml round-bottom flask equipped with a stirrer, of which the internal atmosphere had been sufficiently replaced with nitrogen gas, was charged with 10 g of the powdery solid catalyst component (A4) obtained in Comparative Example 1, 80 ml of toluene, 20 ml of titanium tetrachloride, and 3.3 ml of dimethyl diisobutylmalonate. The mixture was heated to 100° C., and reacted for 2 hours with stirring. After completion of the reaction, the resulting solid product was washed four times with 100 ml of toluene (100° C.), and washed ten times with 100 ml of n-heptane (40° C.) to obtain a solid catalyst component (A5). The titanium content in the solid catalyst component was measured, and found to be 1.4 wt %.

Preparation of Polymerization Catalyst and Polymerization

A polymerization catalyst was prepared, and polymerization was effected in the same manner as in Example 1, except that the solid catalyst component (A5) was used instead of the solid catalyst component (A1). The polymerization results are shown in Table 1.

Comparative Example 2

Synthesis of Solid Catalyst Component (A6)

A 500 ml round-bottom flask equipped with a stirrer, of which the internal atmosphere had been sufficiently replaced with nitrogen gas, was charged with 30 ml of titanium tetrachloride and 20 ml of toluene to prepare a solution. A suspension prepared by suspending 10 g of spherical diethoxymagnesium (sphericity l/w: 1.10) in 50 ml of toluene and 2.0 ml of di-n-butyl phthalate was added to the solution that was maintained at 10° C. (liquid temperature). After heating the solution to 60° C., 4.0 ml of diethyl diisobutylmalonate was added to the solution. The mixture was heated to 90° C., and reacted for 2 hours while stirring. After completion of the reaction, the resulting solid product was washed four times with 100 ml of toluene (90° C.). After the addition of 30 ml of titanium tetrachloride and 70 ml of toluene, the mixture was heated to 112° C., and reacted for 2 hours with stirring. After completion of the reaction, the mixture was washed ten times with 100 ml of n-heptane (40° C.) to obtain a solid catalyst component (A6). The titanium content in the solid catalyst component was measured, and found to be 2.6 wt %.

Preparation of Polymerization Catalyst and Polymerization

A polymerization catalyst was prepared, and polymerization was effected in the same manner as in Example 1, except that the solid catalyst component (A6) was used instead of the solid catalyst component (A1). The polymerization results are shown in Table 1.

Comparative Example 3

Synthesis of Solid Catalyst Component (A7)

A 500 ml round-bottom flask equipped with a stirrer, of which the internal atmosphere had been sufficiently replaced with nitrogen gas, was charged with 20 ml of titanium tetrachloride and 40 ml of toluene to prepare a solution. A suspension prepared by suspending 10 g of spherical diethoxymagnesium (sphericity l/w: 1.10) in 47 ml of toluene was added to the solution. The mixture was stirred at 4° C. for 1 hour. After the addition of 2.7 ml of di-n-butyl phthalate, the mixture was heated to 105° C., and reacted for 2 hours with stirring. After completion of the reaction, the supernatant liquid was removed. After the addition of 20 ml of titanium tetrachloride, 47 ml of toluene, and 3.3 ml of dimethyl diisobutylmalonate, the mixture was heated to 100° C., and reacted for 2 hours with stirring. After completion of the reaction, the resulting solid product was washed four times with 87 ml of toluene (100° C.), and washed ten times with 67 ml of n-heptane (40° C.) to obtain a solid catalyst component (A7). The titanium content in the solid catalyst component was measured, and found to be 3.1 wt %.

Preparation of Polymerization Catalyst and Polymerization

A polymerization catalyst was prepared, and polymerization was effected in the same manner as in Example 1, except that the solid catalyst component (A7) was used instead of the solid catalyst component (A1). The polymerization results are shown in Table 1.

Comparative Example 4

Synthesis of Solid Catalyst Component (A8)

A solid catalyst component (A8) was prepared in the same manner as in Comparative Example 2, except that di-n-butyl phthalate was not added, and 4.4 ml of dimethyl diisobutylmalonate was used in instead of 3.3 ml of diethyl diisobutylmalonate. The titanium content in the solid catalyst component was measured, and found to be 3.1 wt %.

Preparation of Polymerization Catalyst and Polymerization

A polymerization catalyst was prepared, and polymerization was effected in the same manner as in Example 1, except that the solid catalyst component (A8) was used instead of the solid catalyst component (A1). The polymerization results are shown in Table 1.

Example 5

Synthesis of Solid Catalyst Component (A9)

A solid catalyst component (A9) was prepared in the same manner as in Example 1, except that di-n-propyl phthalate was used instead of di-n-butyl phthalate in an equimolar amount.

Preparation of Polymerization Catalyst and Polymerization

A polymerization catalyst was prepared, and polymerization was effected in the same manner as in Example 1, except that the solid catalyst component (A9) was used instead of the solid catalyst component (A1). The titanium content in the solid catalyst component was measured, and found to be 2.3 wt %. The polymerization results are shown in Table 1.

Example 6

Synthesis of Solid Catalyst Component (A10)

A solid catalyst component (A10) was prepared in the same manner as in Example 1, except that diethyl phthalate was used instead of di-n-butyl phthalate in an equimolar amount.

Preparation of Polymerization Catalyst and Polymerization

A polymerization catalyst was prepared, and polymerization was effected in the same manner as in Example 1, except that the solid catalyst component (A10) was used instead of the solid catalyst component (A1). The titanium content in the solid catalyst component was measured, and found to be 2.9 wt %. The polymerization results are shown in Table 1.

Comparative Example 5

Synthesis of Solid Catalyst Component (A11)

A solid catalyst component (A11) was prepared in the same manner as in Comparative Example 1, except that di-n-propyl phthalate was used instead of di-n-butyl phthalate in an equimolar amount.

Preparation of Polymerization Catalyst and Polymerization

A polymerization catalyst was prepared, and polymerization was effected in the same manner as in Example 1, except that the solid catalyst component (A11) was used instead of the solid catalyst component (A1). The titanium content in the solid catalyst component was measured, and found to be 2.5 wt %. The polymerization results are shown in Table 1.

Comparative Example 6

Synthesis of Solid Catalyst Component (A12)

A solid catalyst component (A12) was prepared in the same manner as in Comparative Example 2, except that di-n-propyl phthalate was used instead of di-n-butyl phthalate in an equimolar amount.

Preparation of Polymerization Catalyst and Polymerization

A polymerization catalyst was prepared, and polymerization was effected in the same manner as in Example 1, except that the solid catalyst component (A12) was used instead of the solid catalyst component (A1). The titanium content in the solid catalyst component was measured, and found to be 2.4 wt %. The polymerization results are shown in Table 1.

TABLE 1

| Example | Polymerization activity (g-PP/g-cat.) | BD (g/ml) | XS (wt %) | MFR (g/10 min) |
|---|---|---|---|---|
| Example 1 | 63,100 | 0.45 | 0.9 | 46 |
| Example 2 | 60,600 | 0.45 | 1.0 | 43 |
| Example 3 | 58,700 | 0.45 | 1.1 | 38 |
| Example 4 | 57,200 | 0.45 | 0.9 | 52 |
| Example 5 | 53,900 | 0.45 | 0.8 | 73 |
| Example 6 | 43,100 | 0.43 | 1.1 | 65 |
| Comparative Example 1 | 83,400 | 0.43 | 1.2 | 28 |
| Comparative Example 2 | 88,900 | 0.43 | 1.9 | 90 |
| Comparative Example 3 | 68,500 | 0.41 | 2.1 | 104 |
| Comparative Example 4 | 72,800 | 0.41 | 1.8 | 87 |
| Comparative Example 5 | 66,000 | 0.41 | 0.9 | 23 |
| Comparative Example 6 | 63,900 | 0.40 | 1.2 | 20 |

INDUSTRIAL APPLICABILITY

The olefin polymerization catalyst according to the embodiments of the invention exhibits high activity with respect to hydrogen, and makes it possible to obtain an olefin polymer that exhibits high bulk density while maintaining high stereoregularity.

The invention claimed is:

1. A method for producing a solid catalyst component, the method comprising:

contacting a magnesium compound, a first tetravalent titanium halide compound, and an electron donor compound represented by formula (1) with each other:

$$(R^1)_k C_6 H_{4-k}(COOR^2)(COOR^3) \qquad (1);$$

reacting the magnesium compound, the first tetravalent titanium halide compound, and the electron donor compound represented by formula (1) to obtain a first reaction product;

washing the first reaction product to obtain a solid component;

contacting the solid component, a second tetravalent titanium halide compound, and one or more compound (2) selected from dimethyl isopropylbromomalonate, dimethyl butylbromomalonate, dimethyl isobutylbromomalonate, dimethyl isopropylmalonate, dimethyl butylmalonate, dimethyl isobutylmalonate, dimethyl isopentylmalonate, dimethyl diisopropylmalonate, dimethyl dibutylmalonate, dimethyl diisobutylmalonate, dimethyl diisopentylmalonate, dimethyl isopropylisobutylmalonate, dimethyl bis(3-chloro-n-propyl)malonate or dimethyl bis(3-bromo-n-propyl)malonate reacting the solid component, the second tetravalent titanium halide compound, and said one or more compound (2) to obtain a second reaction product; and washing the second reaction product, to obtain a solid catalyst component, wherein:

$R^1$ represents an alkyl group having 1 to 8 carbon atoms or a halogen atom;

$R^2$ and $R^3$ independently represent an alkyl group having 1 to 12 carbon atoms, wherein $R^2$ and $R^3$ are either identical or different;

k represents 0, 1, or 2, wherein $R^1$ are either identical or different when k is 2;

wherein the electron donor compound represented by formula (1) and said one or more compound (2) are not contacted with each other in the preparation of the solid component and the solid catalyst component.

2. The method according to claim 1, wherein the magnesium compound is an alkoxymagnesium.

3. The method according to claim 1, wherein said one or more compound (2) is dimethyl diisobutylmalonate or dimethyl isobutylmalonate.

4. A catalyst, comprising:

(I) a solid catalyst component obtained by the method of claim 1;

(II) an organoaluminum compound represented by formula (3):

$$R^7_p AlQ_{3-p} \qquad (3); \text{ and}$$

(III) an external electron donor compound, wherein:

$R^7$ represents an alkyl group having 1 to 6 carbon atoms;

Q represents a hydrogen atom or a halogen atom; and p represents a real number that satisfies 0<p≤3.

5. A catalyst, comprising:

(I) a solid catalyst component obtained by the method of claim 2;

(II) an organoaluminum compound represented by formula (3):

$$R^7_p AlQ_{3-p} \qquad (3); \text{ and}$$

(III) an external electron donor compound, wherein:

$R^7$ represents an alkyl group having 1 to 6 carbon atoms;

Q represents a hydrogen atom or a halogen atom; and p represents a real number that satisfies 0<p≤3.

6. A catalyst, comprising:

(I) a solid catalyst component obtained by the method of claim 3;

(II) an organoaluminum compound represented by formula (3):

$$R^7_p AlQ_{3-p} \qquad (3); \text{ and}$$

(III) an external electron donor compound, wherein:

$R^7$ represents an alkyl group having 1 to 6 carbon atoms;

Q represents a hydrogen atom or a halogen atom; and p represents a real number that satisfies 0<p≤3.

7. The catalyst according to claim 4, wherein the external electron donor compound (III) is at least one organosilicon compound selected from the group consisting of an organosilicon compound represented by formula (4) and an organosilicon compound represented by formula (5):

$$R^8_q Si(OR^9)_{4-q} \qquad (4),$$

$$(R^{10}R^{11}N)_s SiR^{12}_{4-s} \qquad (5),$$

wherein:

$R^8$ represents an alkyl group having 1 to 12 carbon atoms, a cycloalkyl group having 3 to 12 carbon atoms, a phenyl group, a vinyl group, an allyl group, or an aralkyl group, and $R^8$ are either identical or different when a plurality of $R^8$ is present;

$R^9$ represents an alkyl group having 1 to 4 carbon atoms, a cycloalkyl group having 3 to 6 carbon atoms, a phenyl group, a vinyl group, an allyl group, or an aralkyl group, and $R^9$ are either identical or different when a plurality of $R^9$ is present;

q represents an integer from 0 to 3;

$R^{10}$ and $R^{11}$ represent a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group, wherein $R^{10}$ and $R^{11}$ are either identical or different, and optionally bond to each other to form a ring;

$R^{12}$ represents a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, or an aryloxy group, wherein $R^{12}$ are either identical or different when a plurality of $R^{12}$ is present; and s represents an integer from 1 to 3.

8. A method for producing an olefin polymer, the method comprising polymerizing an olefin in the presence of the catalyst of claim 4.

9. A method for producing an olefin polymer, the method comprising polymerizing an olefin in the presence of the catalyst of claim 7.

\* \* \* \* \*